Figure 1:
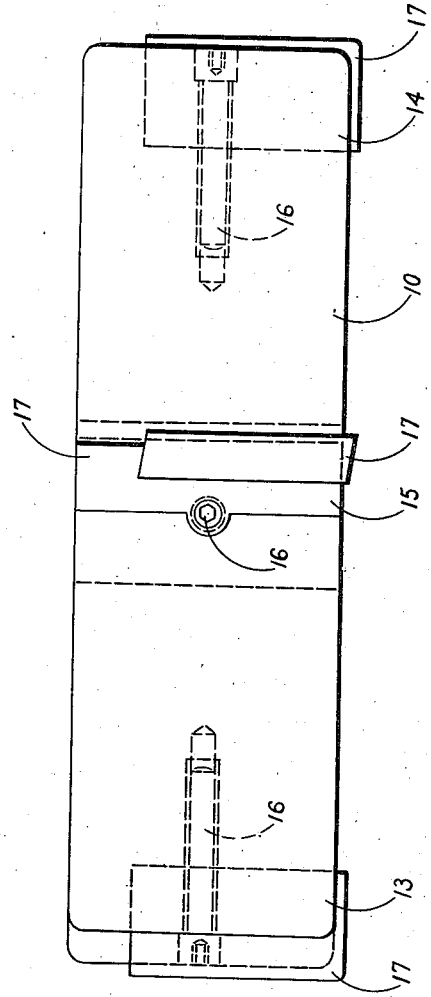

Nov. 30, 1948.                L. F. CATLIN, SR., ET AL                2,455,230
                                    MILLING TOOL
Filed June 13, 1946                                              2 Sheets-Sheet 1

INVENTOR.
LOUIS F. CATLIN SR.
RAYMOND ROURKE
LOUIS F. CATLIN JR.
BY A. T. Sperry
ATTORNEY.

Nov. 30, 1948.    L. F. CATLIN, SR., ET AL    2,455,230
MILLING TOOL
Filed June 13, 1946    2 Sheets-Sheet 2

INVENTOR.
LOUIS F. CATLIN SR.
RAYMOND ROURKE
LOUIS F. CATLIN JR.
BY
ATTORNEY.

Patented Nov. 30, 1948

2,455,230

UNITED STATES PATENT OFFICE 2,455,230

MILLING TOOL

Louis F. Catlin, Sr., Raymond Rourke, and Louis F. Catlin, Jr., Shelton, Conn., assignors to Apex Tool & Cutter Company, Shelton, Conn., a corporation of Connecticut Application June 13, 1946, Serial No. 676,462

4 Claims. (Cl. 29—105)

This invention relates to cutting tools for machine tools and is concerned with rotary cutting tools of the milling or boring bar type. More particularly the invention relates to cutting tools which are characterized by the provision of a plurality of replaceable cutting elements or tool bits which may be securely and adjustably positioned within a cutter body as in the case of a milling cutter and which may be removed and ground sharpened and adjusted to compensate for wear.

While the inventive concept is broadly applicable to many instruments, it is primarily designed for and here illustrated as, a milling cutter of the face milling type in which the individual bits are mounted to extend radially from a circular body with their cutting edges protruding from the front side face of the body. Such bits are usually formed with a welded, carbide, or like alloy, cutting tip with which the present invention is not concerned.

The present invention is concerned with the securement of the bits in the cutter body so that a novel and improved rigidity of combination is achieved. For a consideration of the securing structure here employed, reference may be had to our copending application Serial No. 676,463, filed June 13, 1946, wherein like means is used for securing the bit in a shank type tool holder. The present application is concerned with the application of such means to hold such a bit in a multiple bit tool of the milling and particularly face milling type tool.

The objects of the present invention therefore partakes of the disiderata set forth in connection with the above identified copending application.

In general terms the primary object is to provide a multiple bit tool assembly wherein the bits are retained within a maximum of rigidity whereby the combination approaches the characteristics of an integral structure.

More specifically the invention seeks to provide an assembly in which retaining forces and cutting forces each react to deliver a thrust back into the mass of the holder body so as to minimize the danger of loosening or breakage thus to insure the achievement of the general object above enumerated.

These objects are achieved by the provision of a side supporting wall formed on the bit seat whereby transverse thrusts are received and displacement is precluded.

Figure 2:
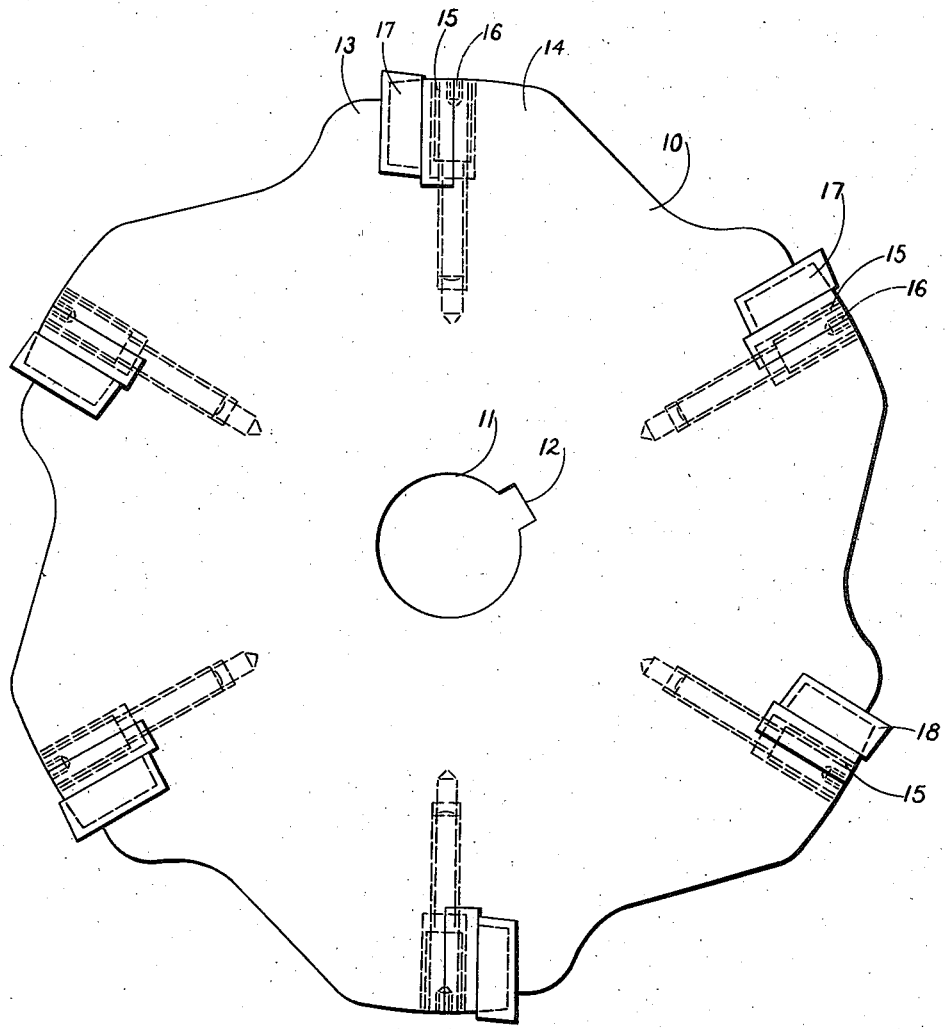

Further objects and features of the present invention and the manner by which such objects and features are attained will be apparent from a consideration of the following specification taken in conjunction with the following drawings, in which:

Fig. 1 is a side elevation of a face milling cutter embodying one form of the present inventive concept, and Fig. 2 is a face view of the cutter shown in Fig. 1.

While the inventive concept is here disclosed as applied to a face milling cutter (having only six bits for convenience of illustration) it will, of course, be understood that the inventive concept is applicable to other types of milling cutters and also to boring bars or in fact any type of holder where inserted teeth are secured in a radial relation from the center of the tool body.

In the drawings the numeral 10 indicates the tool body which is of generally circular outline having a central bore 11 and a keyway 12 by means of which the body is secured to and rotated with the arbor of a milling machine. For purposes of illustration the body is of simple solid construction, but for the base 11 and keyway 12, however, in practice many modifications of this construction may be employed and for boring bars or the like the body is provided with a shank which is receivable in a tool holding chuck.

The periphery of the disc like body 10 in the present case is provided with six equally spaced tool seats and bit securing means. In practice the number of stations may be materially increased over the six here shown and the peripheral contour may be greatly modified from the configuration here shown. Such features while illustrative of one embodiment are in no way intended to depict features of construction to which the practice of the invention is limited.

Each of the equally spaced tool positions on the body 10 comprises a furcation formed by an upper wall 13 and a bottom wall 14. On the surface of the bottom wall 14 is mounted a wedge 15 which is adjustable for movement radially in the furcation by means of a front operated screw 16. Each wedge is also provided with a side flange or shoulder 17 which extends radially of the body and thus along one side of the wedge. The upper surface of the wedge is radially parallel with the under surface of the wall 13 while transversely the surface inclines downwardly towards the bottom wall 14.

The tool bit or cutter itself is indicated at 17 and comprises a plane rectangular body of cutting material, the portion of which that extends beyond the body 10 being suitably ground or shaped to provide a desired cutting edge.

By the structure thus set forth it will be seen that the bits will be secured in the furcation by inward adjustment of the wedge and will be transversely supported by the side shoulder or flange. The inclination of the wedge surface towards the flange will materially aid in seating and maintaining rigid the bit within the body while adjustment is permitted by actuation of the securing screw.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and, therefore, such adaptations should be, and are intended to be, comprehended within the meaning and range of equivalency of the following claims.

What we claim is:

1. A cutting tool comprising, in combination, a body having blade recesses opening outwardly, tool bits each comprising a block of cutting material disposed in each of said recesses with one side and one end projecting therefrom, cutting edges formed along the leading edges of said side and end, a bit retaining wedge mounted in each recess, each wedge including a side shoulder having a face inclined with respect to an axially transverse plane passing through said body and engaging said bit on the side opposite said side cutting edge.

2. A cutting tool, comprising, in combination, a body having blade recesses opening outwardly, tool bits each comprising a block of cutting material disposed in each of said recesses with one side and one end projecting therefrom, cutting edges formed along the leading edges of said side and end, a bit retaining wedge mounted in each recess, each wedge including a shoulder having a face inclined inwardly from its upper surface with respect to an axially transverse plane passing through said body and engaging said bit on the side opposite said side cutting edge to over-lie a portion of said bit.

3. A construction as set forth in claim 1 in which the wedge is disposed in the recess behind the bit with respect to the direction of rotation of the tool while cutting.

4. A construction as set forth in claim 2 in which the wedge is disposed in the recess behind the bit with respect to the direction of rotation of the tool while cutting and in which a securing means is provided for said wedge in the form of an adjusting screw operable from the periphery of said body.

LOUIS F. CATLIN, Sr.
RAYMOND ROURKE.
LOUIS F. CATLIN, Jr.

REFERENCES CITED

The following references are of record in the file of this patent:

UNITED STATES PATENTS

| Number | Name | Date |
| --- | --- | --- |
| 1,681,675 | Miller | Aug. 21, 1928 |
| 1,962,162 | Weddell | June 12, 1934 |
| 2,224,173 | Weddell | Dec. 10, 1940 |
| 2,278,274 | Lind | Mar. 31, 1942 |